United States Patent
Wang

(10) Patent No.: US 9,477,094 B2
(45) Date of Patent: Oct. 25, 2016

(54) STRUCTURE OF EYEGLASSES

(71) Applicant: SHINY STAR OPTICAL CO., LTD., Tainan (TW)

(72) Inventor: Nai-Cheng Wang, Tainan (TW)

(73) Assignee: SHINY STAR OPTICAL CO., LTD., Tainan (TW)

( * ) Notice: Subject to any disclaimer, the term of this patent is extended or adjusted under 35 U.S.C. 154(b) by 17 days.

(21) Appl. No.: 14/586,970

(22) Filed: Dec. 31, 2014

(65) Prior Publication Data
US 2016/0103334 A1    Apr. 14, 2016

(30) Foreign Application Priority Data

Oct. 8, 2014   (TW) .............................. 103217891 U

(51) Int. Cl.
G02C 5/22    (2006.01)
G02C 5/00    (2006.01)
G02C 5/10    (2006.01)
G02C 5/14    (2006.01)

(52) U.S. Cl.
CPC ................ G02C 5/008 (2013.01); G02C 5/10 (2013.01); G02C 5/146 (2013.01); G02C 5/2272 (2013.01)

(58) Field of Classification Search
CPC .... G02C 5/22; G02C 5/2227; G02C 5/2254; G02C 5/2272; G02C 2200/22
USPC ............................ 351/113, 121, 153; 16/228
See application file for complete search history.

(56) References Cited

U.S. PATENT DOCUMENTS 6,139,143 A * 10/2000 Brune .................... G02C 3/003
                                                                16/228
7,540,608 B2 * 6/2009 Carlon ................... G02C 5/008
                                                                16/228

* cited by examiner

*Primary Examiner* — Huy K Mai
(74) *Attorney, Agent, or Firm* — Leong C. Lei

(57) ABSTRACT

An eyeglasses structure includes a frame, temples, metal bars that are curved and have two ends each forming a single-loop hook, rivets, and curved grooves. The temples each have a surface forming a curved groove receiving the single-loop hook therein so that the metal bar is curved toward the frame to allow the single-loop hook of the metal bar to connect to a side edge portion of the frame. The side edge portion of the frame is provided with a box having a channel formed therein to receive the single-loop hook to fit therein and includes a box base and a box cover that are formed with multiple the rivet holes, so that with the single-loop hooks of the metal bars being disposed in the channels and covered by the box covers, rivets are individually put through the rivet holes for riveting and fixing.

14 Claims, 4 Drawing Sheets

US 9,477,094 B2

STRUCTURE OF EYEGLASSES

(a) TECHNICAL FIELD OF THE INVENTION

The present invention generally relates to an improved structure of eyeglasses, and more particularly to a novel eyeglasses frame connection structure that, compared to a conventional structure of eyeglasses, has a simple structure and is easy to manufacture and has a low assembly cost.

(b) DESCRIPTION OF THE PRIOR ART

Eyeglasses are a modern product and thanks to the invention of eyeglasses, an eyesight impaired person is allowed to improve the eyesight thereof and maintain quality of daily living by wearing a pair of eyeglasses with corresponding eyesight correction configuration.

Conventional eyeglasses have a connection structure that is provided for connecting a frame to a pair of temples. The connection structure is generally composed of a small-sized pivotal hinge. Such a connection structure that one end of the pivotal hinge is embedded in one temple and an opposite end is embedded in the frame provides an excellent effect of pivoting to overlap, but has certain shortcomings. Manufacturing the small-sized pivotal hinge is generally complicated and difficult and further, embedding the small-sized pivotal hinge in the frame and temples for assembly is also troublesome so that it is generally hard to reduce the cost of the eyeglasses. An eyeglasses manufacturer is generally incapable of efficiently manufacturing eyeglasses and the sales price the eyeglasses cannot be reduced to benefit the general consumers. This leads to a great economic burden for those fashion-follower consumers who prefer to change eyeglasses and other fashion personal items and decorations frequently for fashion purposes have to purchase several pairs of expensive eyeglasses. This also imposes a problem to the popularity of new fashion trend of eyeglasses styles. This also cause a problem to public sites where eyeglasses, such as reading glasses, are provided for free borrow for such a free service of temporary eyesight correction would require a high cost and purchasing eyeglasses would be hard.

In light of the forgoing problems that the structure connecting a frame to a temple is complicated so as to increase the assembly cost of the eyeglasses and thus the high cost of eyeglasses cause a negative influence on the consumers' behavior of purchasing new or substitute eyeglasses, the present invention aims to provide a solution to overcome such problems.

SUMMARY OF THE INVENTION

The present invention provides an improved structure of eyeglasses that is aimed to overcome the shortcomings of the conventional eyeglasses and is structured so as to comprise a frame, a pair of temples, a pair of metal bars each having an entirety that is curved in a substantially perpendicular manner and having two ends each forming a single-loop hook, a plurality of rivets, and a pair of curved grooves, wherein each of the metal bars has an end connected to a corresponding one of the temples and forming a single-loop hook and the temple has a temple-connecting surface corresponding to the metal bar and comprising a curved groove receiving the single-loop hook to tightly fit and embedded therein so that the metal bar connected to the temple is curved toward a corresponding side edge portion of the frame to allow the single-loop hook on the end of the metal bar that is opposite to the connection thereof with the temple to connect to the corresponding side edge portion of the frame. The side edge portion of the frame that corresponds to and is connected with the metal bar is provided with a box comprising a penetration notch formed therein. The box comprises a channel formed therein to receive the single-loop hook to fit therein. The box comprises a box base and a box cover that are formed with multiple the rivet holes, so that with the single-loop hooks of the metal bars being disposed in the channels and bar bodies of the metal bars respectively extending outward through the penetration notches and covered by the box cover, rivets are individually put through the rivet holes for riveting and fixing so as to securely couple together the frame, the metal bars, and the temples thereby making the structure simple and easy to manufacture and assemble. This is an object of the present invention.

Further, the improved structure of eyeglasses according to the present invention does not involve a small-sized pivotal hinge to connect temples and a frame and instead, a metal member that is simply formed in such a way that two ends thereof each form a single-loop hook and the entirety thereof is curved in a substantially perpendicular manner is used to connect the temples and the frame so that the material cost is reduced. Further, the simple connection structure also helps reduce the manufacturing cost and the assembling cost. As such, with the cost being reduced, the manufacturers have flexibility to lower down the price for sales to thereby benefit the general consumers and to facilitate the emerging of a trend for purchasing eyeglasses for substitution. This is another object of the present invention.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
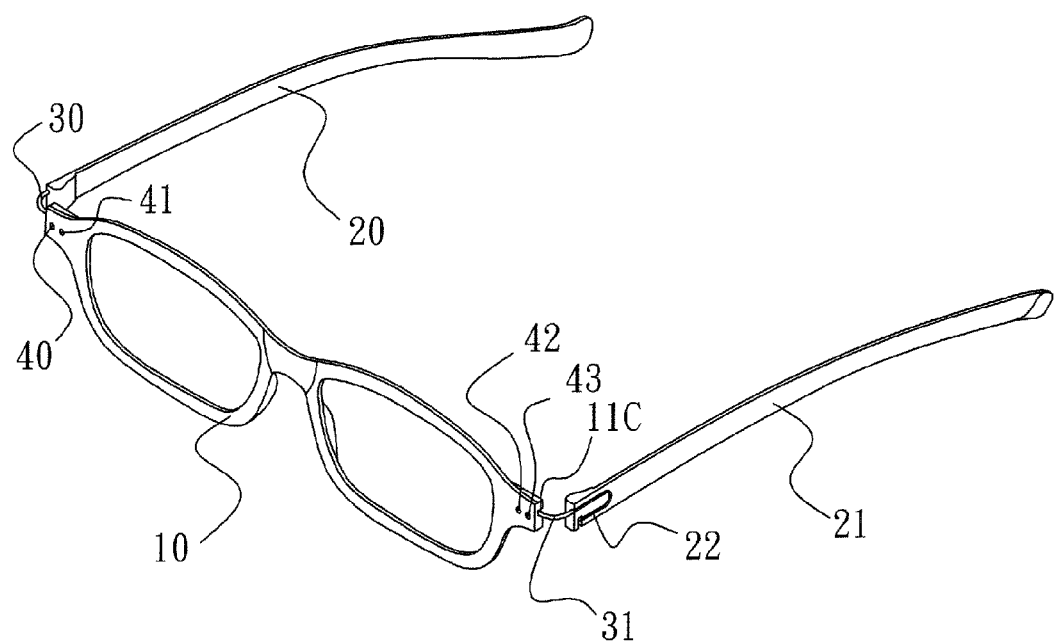
FIG. 1 is a perspective view showing an improved structure of eyeglasses according to the present invention.

The shortcomings of the conventional eyeglasses have been discussed above and repeated description will be omitted here. Since a pair of eyeglasses is generally of a symmetric configuration where the left half and the right half are identical, a structure according to the present invention will be described with reference to the right-hand side frame portion of the eyeglasses. FIG. 1 is a perspective view showing an improved structure of eyeglasses according to the present invention and this drawing is made by observing, in an inclined manner, from the outside of the eyeglasses toward the interior thereof surrounded by the eyeglasses. Such an improved structure of eyeglasses of the present invention comprises a frame 10, a pair of temples 20, 21, a pair of metal bars 30, 31 each showing a curved configuration in the entirety thereof, a plurality of rivets 40, 41, 42, 43, and a pair of curved grooves 22. The frame 10 provides a primary configuration of the eyeglasses and also serves as a structure for mounting lenses. The frame 10 has two side ends each forming a sideway penetration notch 11C. The metal bars 30, 31, with one end of each being fixed to the frame 10, respectively extend outward through the sideway penetration notches 11C at the two side ends of the frame 10 and each have an opposite end tightly fit into the curved groove 22 formed in the corresponding one of the temples 20, 21. The curved grooves 22 are respectively formed in outside surfaces of the temples 20, 21. When the temples 20, 21 are expanded, the metal bars 30, 31 are tightly fit into and thus embedded in the curved grooves 22 so as to keep the temples 20, 21 in the expanded condition without easy collapse, allowing for easy wearing with one hand. The improved structure of eyeglasses has a primary structure that is composed of the above components/parts.

Figure 2:
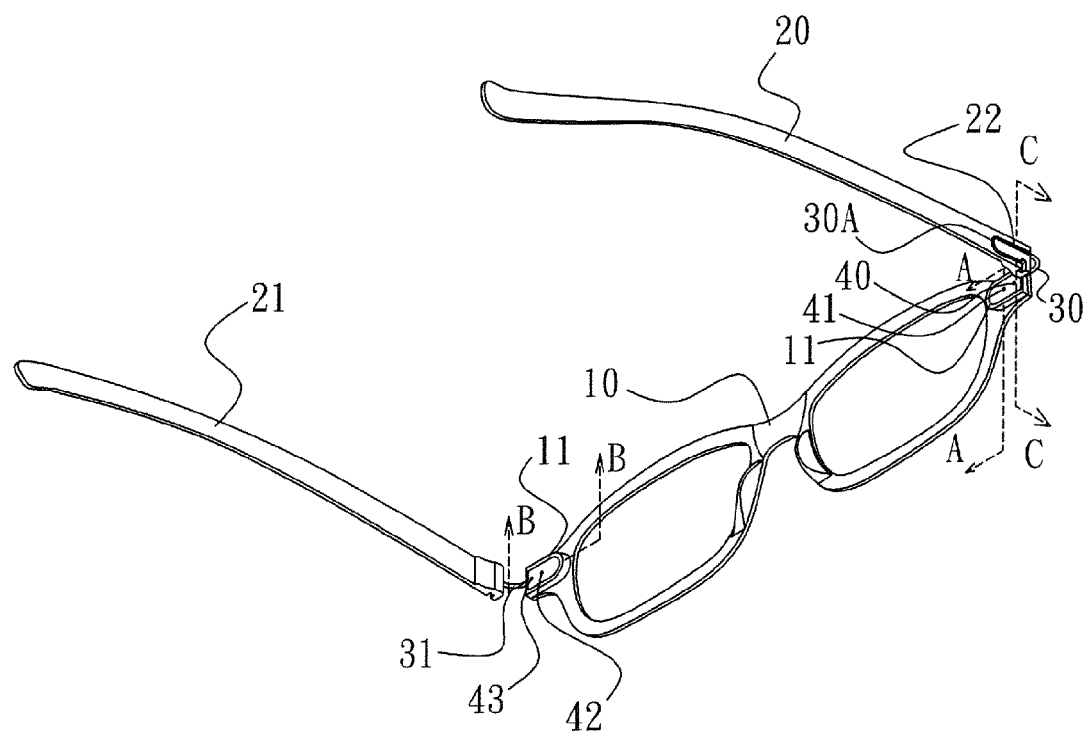
FIG. 2 is another perspective view showing the improved structure of eyeglasses according to the present invention.

FIG. 2 is another perspective view showing the improved structure of eyeglasses according to the present invention and this drawing is made by observing, in an inclined manner, from the interior of the eyeglasses surrounded thereby toward the outside of the eyeglasses. It can be seen from FIG. 2 that the frame 10 have two opposite side edge portions that are each provided with a box 11. The metal bars 30, 31 have bar bodies extending outward from sides of the boxes 11 on the two side edge portions of the frame 10 and rivets 40, 41, 42, 43 are applied to rivet and fix the box 11 and the portions of the metal bars 30, 31 within the boxes. The other ends of the metal bars 30, 31 are respectively formed with single-loop hooks 30A that are tightly fit into and embedded in the curved grooves 22 formed in the outside surfaces of the temples 20, 21 so as to form the improved structure of eyeglasses. The metal bars 30, 31 are made of a material selected from a wide range of materials and are preferably made of a metallic material of high elasticity and high strength, such as memory titanium materials, stainless steels, alloys, and memory metals.

Figure 3:
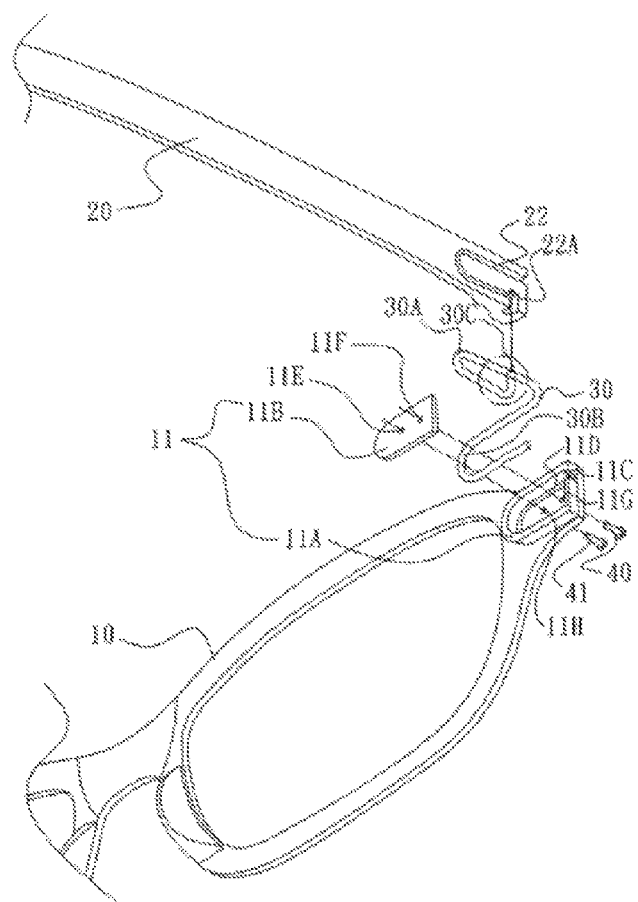
FIG. 3 is an exploded view showing the improved structure of eyeglasses according to the present invention.
Figure 3A:
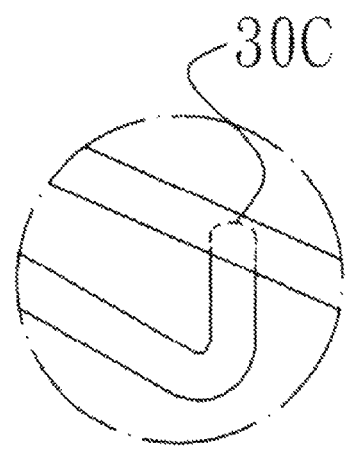
FIG. 3A is an enlarged view of a circled portion of FIG. 3.

Since the eyeglasses have a symmetric configuration where the left and right halves are identical, the present invention will be further described with reference to the right-hand side frame portion. FIG. 3 is an exploded view showing the improved structure of eyeglasses according to the present invention and it can be seen from this drawing that the metal bars 30 each show, in the entirety thereof, a curved configuration having two ends each forming a single-loop hook 30A, 30B with a barb 30C (best seen in FIG. 3A) extending inward from the bar tip corresponding to the temple 20. The temples 20 have outside surfaces in which the curved grooves 22 are respectively formed in such a way that the curved grooves 22 each comprise a fastening hole 22A at a location corresponding to the barb 30C to receive the barb 30C to extend therein ad coupled thereto. With the barbs 30C being inserted into the fastening holes 22A, the temples 20 are allowed to rotate about center axes respectively defined by the barb 30C for expanding and collapsing. Further, the elasticity of each metal bar 30 provides a clamping force between the bar body and the barb 30C. In addition, the temple 20 has a thickness greater than a spacing distance between the metal bar 30 and the barb 30C so that when the temple 20 is moved to an expanded condition, besides the single-loop hook 30A of the metal bar 30 being tightly fit into and embedded in the curved groove 22 of the temple 30, the metal bar 30 can clamp and hold the temple 20, whereby the temple 20 is prevented from getting readily loosened and collapsed. The connection between each of the metal bars 30 and the frame 10 is achieved with the box 11 formed at each of the side edge portions of the frame 10. The box 11 is composed of a box base 11A and a box cover 11B. The box 11 forms therein a channel 11D that is sized and shaped to receive the single-loop hook 30B to fit therein. The box base 11A comprises rivet holes 11G, 11H formed therein so that when the single-loop hook 30B of the metal bar 30 is received in the channel 11D, the bar body of the metal bar 30 extend outward through the sideway penetration notch 11C. The box cover 11B that comprises rivet holes 11E, 11F formed therein is set to cover the base in such a way that rivets 40, 41 are allowed to penetrate through the rivet holes 1E, 11F, 11G, 11H for riveting and fixing. As such, the metal bars 30 and the frame 10 can be securely fixed together.

Figure 4:
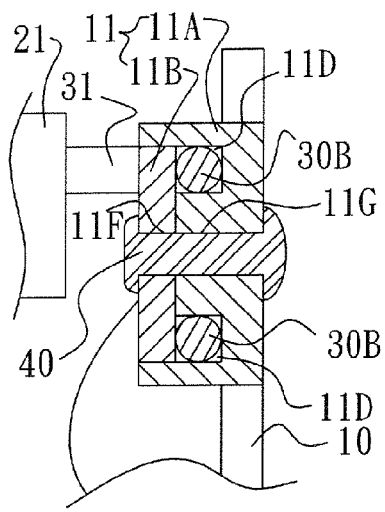
FIG. 4 is a cross-sectional view taken along line A-A of FIG. 2.

FIG. 4 shows a cross-sectional view from which it can be seen that the frame 10 are provided on each of two opposite side edge portions with a box 11. The box 11 is composed of a box base 11A and a box cover 11B. The box base 11A comprises a channel 11D formed therein. When the single-loop hook 30B of the metal bar 30, 31 is fit into and fixed in the channel 11D and covered by the box cover 11B, the rivet 40 is put through the rivet holes 11F, 11G to complete riveting and fixing. The other end of the metal bar 31 is then connected to the temple 21 to complete the improved structure of eyeglasses.

Figure 5:
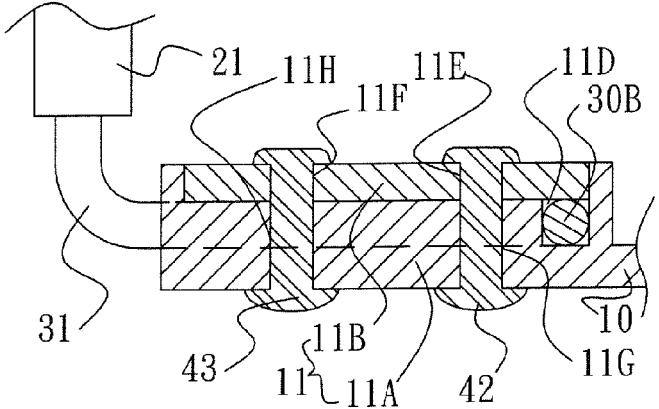
FIG. 5 is a cross-sectional view taken along line B-B of FIG. 2.

FIG. 5 shows a cross-sectional view from which it can be seen that the single-loop hook 30B of the metal bar 31 is disposed in the channel 11D of the box base 11A and covered by the box cover 11B. The rivets 42, 43 are individually put through the rivet holes 11E, 11F, 11G, 11H and forcibly riveting is applied to compress the box base 11A, the single-loop hook 30B, and the box cover 11B to have the metal bar 31 securely coupled to the frame 10. The metal bar 31 is then coupled to the temple 21. The primary function of the rivets 42, 43 is to rivet and securely couple together different parts. Thus, the rivets 42, 43 can be of a structure that is solid, hollow, dual-layered, or a specific configuration, provided they provide a function of securely coupling for the improved structure eyeglasses according to the present invention. All sorts of configuration of the rivets 42, 43 can be of a particular range of application and the rivets 42, 43 referred to in the present invention widely covers all sorts of rivet that achieve the function of securely coupling. No specific limitation is imposed to the rivets 42, 43 in the present invention.

Figure 6:
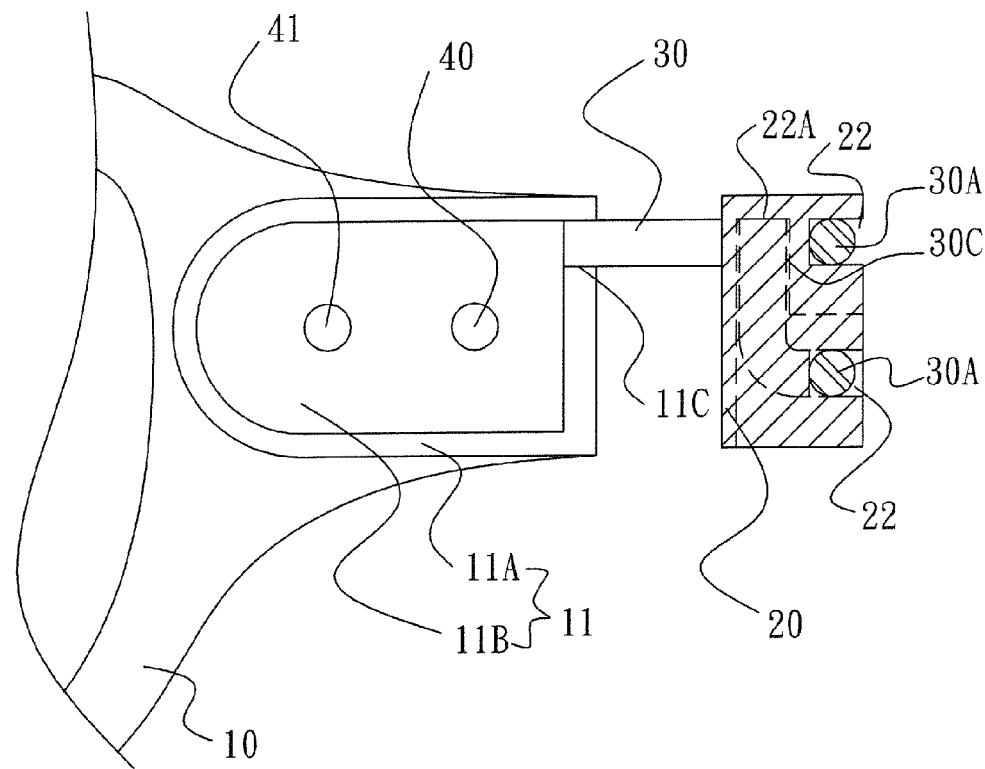
FIG. 6 is a cross-sectional view taken along line C-C of FIG. 2.

FIG. 6 shows a cross-sectional view from which it can be seen that the metal bar 30 is curved toward the temple 20 and has a bar tip from which a barb 30C extends inward. The temple 20 has an outside surface in which the curved groove 22 is formed and the curved groove 22 comprises a fastening holes 22A formed therein, at a location corresponding to the barb 30C, to receive the barb 30C to insert therein. With the barb 30C being inserted into the fastening hole 22A, the temple 20 is allowed to rotate about a center axis defined by the barb 30C for expanding and collapsing.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An eyeglasses structure, comprising:
    a frame, which provides a primary configuration of the eyeglasses and receive lenses mounted thereto, the frame having two opposite side edge portions each of which comprises a box that comprises a sideway penetration notch formed therein, the box comprising rivet holes formed therein;
    a pair of temples, which are respectively connected to the two side edge portions of the frame;
    a pair of curved grooves, which are respectively formed in outside surfaces of the temples respectively corresponding to metal bars;
    a pair of metal bars, each of which comprises a bar body having a middle that is curved in a substantially vertical manner and two ends each forming a single-loop hook, the single-loop hook of one of the ends being connected to the box of the frame and the single-loop hook of the other one of the ends being connected to the temple so as to connect the frame and the temples together, the bar body of each of the metal bars having elasticity to provide a clamping force for clamping into the curved groove formed in a template that has a thickness greater than a spacing distance between the bar body of the metal bar and the barb, whereby the temples are selectively arranged to be substantially normal to the frame for easy wearing; and
    a plurality of rivets, which is set through the rivet holes for riveting and fixing thereby securely coupling the frame and the metal bars together.

2. The eyeglasses structure according to claim 1, wherein the boxes at the two side edge portions of the frame are each composed of a box base and a box cover.

3. The eyeglasses structure according to claim 2, wherein the box base and the box cover are each provided with rivet holes formed therein so that when the metal bar is set in the box base of the frame and covered by the box cover, the rivets are put through the rivet holes for riveting and fixing the frame and the metal bars to achieve connection therebetween.

4. The eyeglasses structure according to claim 1, wherein the metal bars each have a bar tip at the end thereof corresponding to the temple and comprising a barb extending inward therefrom.

5. The eyeglasses structure according to claim 4, wherein the curved grooves each comprise a fastening hole formed therein to correspond to the barb for receiving the barb to insert into the fastening hole, whereby due to elasticity, the metal bar is driven by a clamping force induced between the bar body and the barb to fit into the curved groove formed in the temple that has a thickness greater than a spacing distance between the bar body of the metal bar and the barb and the fastening hole formed in the curved groove.

6. The eyeglasses structure according to claim 4, wherein the metal bars are made of an integrally-formed memory titanium material having high elasticity and high strength.

7. The eyeglasses structure according to claim 4, wherein the metal bars are made of an integrally-formed stainless steel material having high elasticity and high strength.

8. The eyeglasses structure according to claim 4, wherein the metal bars are made of an integrally-formed memory metal material having high elasticity and high strength.

9. The eyeglasses structure according to claim 4, wherein the metal bars are made of an alloy material having high elasticity and high strength.

10. The eyeglasses structure according to claim 1, wherein the metal bars are made of an integrally-formed memory titanium material having high elasticity and high strength.

11. The eyeglasses structure according to claim 1, wherein the metal bars are made of an integrally-formed stainless steel material having high elasticity and high strength.

12. The eyeglasses structure according to claim 1, wherein the metal bars are made of an integrally-formed memory metal material having high elasticity and high strength.

13. The eyeglasses structure according to claim 1, wherein the metal bars are made of an alloy material having high elasticity and high strength.

14. The eyeglasses structure according to claim 1, wherein the box base comprises a channel formed to receive the single-loop hook therein to enhance stability.

* * * * *